INVENTOR
ARTHUR K. MORRIS

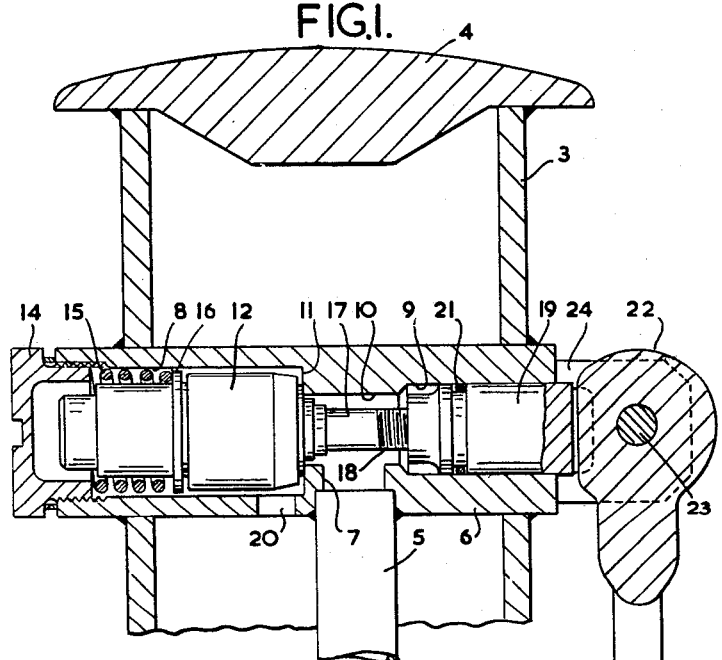
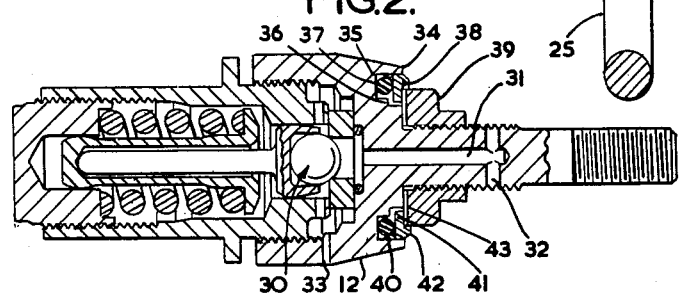

BY Reynolds + Christensen

ATTORNEYS

United States Patent Office 3,148,860
Patented Sept. 15, 1964

3,148,860
FLUID VALVES
Arthur K. Morris, Tewkesbury, England, assignor to Dowty Mining Equipment Limited, Tewkesbury, England, a British company
Filed Jan. 30, 1962, Ser. No. 169,880
Claims priority, application Great Britain Jan. 31, 1961
6 Claims. (Cl. 251—172)

This invention relates to fluid valves and in particular to valve for use with hydraulic mine props as pressure release or as overpressure valves. Such valves are required to maintain a fluid tight seal without leakage when closed, and to operate satisfactorily over a long period of time without developing mechanical defects.

A pressure release valve, for example, is normally designed to be opened by hand under moderate pressure and there is consequently a problem in designing a valve which will not leak although held closed by only a moderate load. One expedient has been to employ a valve sealing element of relatively soft or resilient material to ensure a fluid-tight seal, but such materials are liable to wear or to deterioration, and also liable to extrude under the high fluid pressure to which the seal may be subjected. Another expedient has been to employ an annular knife-edged sealing element and a cooperating sealing element both of rigid material, but such an arrangement presents two further problems. All parts of the annular knife edge should bear with even pressure against the cooperating seat. Also, there is risk of damage to the knife edge, the valve seat, or both, under valve-closing impact, even if the static closing load is reduced by the provision of counterbalancing means.

In the accompanying drawings illustrating the invention:

FIGURE 1 shows partly in section the upper part of a hydraulic prop embodying a pressure release valve and operating mechanism;

FIGURE 2 is an axial sectional view of the movable or inner valve member of FIGURE 1 on an enlarged scale;

Figure 3:
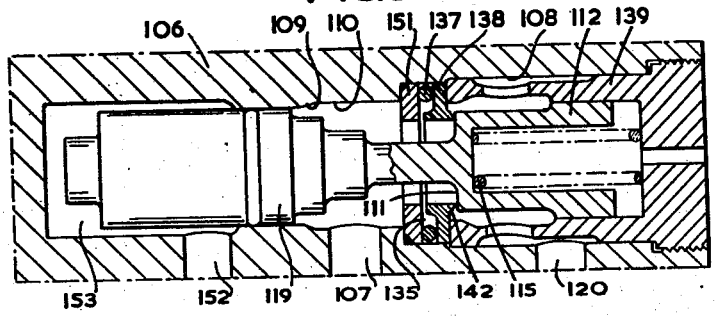
FIGURE 3 is a sectional diagram of another construction of pressure release valve.

FIGURE 1 shows the upper part of the ram tube 3 of a telescopic pit prop surmounted by a cap 4 which is engageable with the mine roof. The interior of the ram tube 3 forms a reservoir R for hydraulic fluid which may be transferred by a hand pump into a pressure chamber at a base of the pit prop, such an arrangement being well known and for this reason not illustrated. A stack pipe from the pressure chamber extends upwardly and centrally within the ram tube 3, and its upper end 5 seen in FIGURE 1 is fixed by welding to a tubular valve housing 6 which extends transversely across the upper end of the ram tube 3. The valve housing 6 projects at both ends beyond the ram tube 3 and is fixed in the ram tube 3 by welding.

The upper end 5 of the stack pipe opens by way of a fluid inlet opening 7 in the valve housing 6 from the work chamber of the prop into an axial bore 10, and this axial bore leads at one end into an enlarged co-axial bore 8 and at the other end into a co-axial bore 9 of lesser diameter than the bore 8.

The step between the axial bore 10 and the enlarged bore 8 comprises a sealing element formed as a flat transverse annular face 11 whose function is that of a rigid release valve seating as will be described. The outer end of the bore 8 is closed by a plug 14, while a spring 15 is interposed between the plug 14 and a flange 16 on a valve member 12 which is movable within the bore 8 to return the valve member 12 against the annular seating 11. A fluid outlet opening 20 in the wall of the valve casing 6 places the bore 8 in direct communication with the reservoir R. A stem 17 extends from the valve member 12 and through the bore 10 to a screw-threaded termination 18 which carries a counterbalancing piston 19 mounted slidably within the bore 9 and subject to fluid inlet pressure urging it to the right, while a sealing ring 21 encircles the piston 19 to provide a sliding seal against the bore 9.

Referring to FIGURE 2, the valve member 12 is formed as a capsule containing a spring-loaded relief valve 30 with a pressure passage 31 leading thereto from a cross-drilling 32 within the bore 10, and a vent passage 33 from the capsule into the large diameter bore 8 which communicates wiht outlet pressure.

The end face 34 of the capsule 12 adjacent the seating face 11 is formed with an annular recess 35 which has an intermediate step 36. A resilient rubber O-ring 37 is located in the base of the recess 35, and an annular metal sealing element 38 slidably received in the recess is retained outwardly of the O-ring 37 by an abutment formed by a nut 39 which is screwed on the stem 17 into engagement with the face 34. The sealing element 38 which is of rigid material has an inward radial flange 41 which is spring-loaded against the nut 39 by compression of the O-ring so that it normally lies axially clear of the step 36. The element 38 has an annular sealing edge 42 disposed radially beyond the nut 39 for substantially linear engagement with the complemental sealing face 11, but within the outer diameter of element 38. It will be obvious that the sealing edge and the sealing face can be transposed, that is, the sealing edge 42 may be formed on the face 11 while the sealing element 38 is formed with a plane seating face. The diameter of the edge 42 is less than the diameter of the counterbalancing piston 19 to provide a differential area which is sufficient to maintain the capsule 12 in sealing engagement with seating face 11 under the pressure in the work chamber of the prop acting in the central portion 10 of the bore.

Initial closure of the edge 42 on the sealing face 11 is effected by the spring 15, and the seating pressure increases with fluid pressure acting on the differential area. Radial slots 43 are formed in the face of the nut 39, which with a clearance between the inner radial edge of the sealing element 38 and the recess 35 form passage means providing fluid communication between the bore 10 and the rear face of the sealing element 38. The O-ring 37 provides a fluid tight seal between the outer radial edge of the sealing element 38 and the recess 35. An anti-extrusion ring 40 of the generally triangular cross-section is preferably provided between the O-ring 37, the sealing element 38 and the outer wall of the recess 35. The outer radial edge of the sealing element 38 is of greater diameter than the piston 19. When the valve is closed the total area of the rear surface of the sealing element 38 is subject to inlet fluid pressure, while the front surface engaging the abutment 39 is subject to inlet fluid pressure inwardly, only, of the sealing edge 42. The sealing element 38 therefore has a differential area subject to fluid pressure which maintains the sealing element 38 against the abutment with a force which exceeds the fluid-actuated closing force on the valve member 12. The static valve closing force is therefore insufficient to displace the sealing element 38 from the nut 39.

When it is desired to release the pressure from the pressure chamber of the prop, the valve capsule 12 is lifted off the seating 11 by means of a cam 22, this cam 22 being mounted beyond the outer end of the piston 19 on a pivot pin 23 which bridges the arms of a slotted projection 24 of the valve housing 6. The cam 22 has a lever arm formed as a loop 25 which is engageable by a chain hook so that the pit prop may be released and then withdrawn by a pull on the chain from a position of safety.

Turning movement of the cam 22 displaces the piston 19 sufficiently to lift the capsule 12 and sealing element 38 from the complemental sealing element 11 against the load of the spring 15 and the load due to hydraulic pressure acting on the area of the piston 19 which is in excess of that enclosed within the sealing edge 42. Since the pressure differential is small the valve can be opened under a moderate applied load. If the cam 22 is turned smartly back to its inoperative position, the capsule 12 may return with a hammer blow against the seating face 11, especially if the cam 22 is turned to close the valve while there is still considerable liquid pressure in the chamber of the prop. If the metal sealing element 38 were rigidly fixed in the capsule 12 the impact would be liable to cause indentation of the seating face 11 by the sealing edge 42, or to cause damage to the sealing edge 42 itself. By means of the present invention, after the sealing element 38 engages the sealing element 11, continued movement of the capsule 12 is arrested by compression resistance of the O-ring 37 and by fluid pressure acting between the sealing element 38 and the base of the recess 35. The sealing edge 42 which is formed as a knife edge having an acute apex angle, has a small area of contact with the seating face 11 to ensure adequate sealing pressure and yet by means of its shock absorbing mounting in the capsule, the reduction of impact force between the sealing edge 42 and the seating face reduces the risk of damage.

After impact the static condition of valve closure is restored in which fluid pressure acting on the rear surface of the element 38 both directly and through the O-ring 37, maintains the element 38 against the nut 39. The element 38 will tilt with respect to the face of the nut 39 while maintaining continuous sealing contact between its sealing edge 42 and the seating face 11.

The pressure release valve of FIGURE 3 comprises a housing 106 having a bore with a central portion 110 with a fluid inlet opening 107, a co-axial larger diameter portion 108 which has a fluid outlet opening 120, and another co-axial portion 109 on the opposite side of the central portion 110 that is of lesser diameter than portion 108. In this example a flat washer 151 at the junction of the bores 108 and 110 forms the base of a recess 135 which slidably receives an annular metal sealing element 138. A rubber O-ring 137 is interposed compressively between the washer 151 and the element 138 and the latter is retained by an abutment which is formed as a screw plug 139 closing the end portion 108. Fluid pressure at the inlet opening 107 has access to the recess 135 through a gap between the washer 151 and the sealing element 138.

A movable valve member 112 disposed within the bore 108 has an annular seating face 111 co-operable with sealing edge 142 which is formed on the sealing element 138. A spring 115 is interposed between the valve member 112 and the screw-plug 139. The bore portion 109 which is of larger diameter than the annular sealing edge 142 receives a counterbalancing piston 119 which is fixed to the valve member 112. The main difference over the preceding example is that the resiliently loaded sealing element 138 is carried by the fixed valve member 106 while the other sealing element 111 is a rigid part of the valve member 112. Operation of the valve is similar to that previously described, except that for opening the valve, fluid pressure is applied through an opening 152 to a chamber 153 in the housing 106 which encloses the free end of the piston 119.

Figure 4:
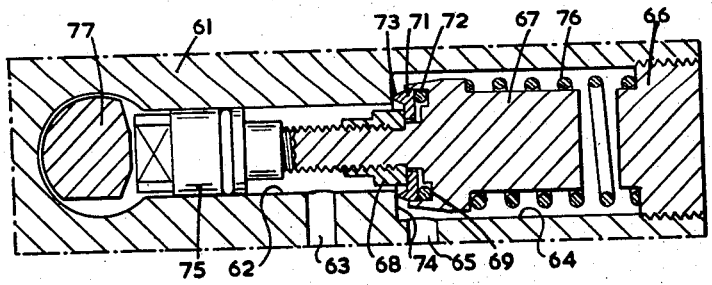
FIGURE 4 is a sectional diagram of an overpressure valve which is also operable as a pressure release valve.

The valve in FIGURE 4 comprises a valve housing 61 having a bore with a small diameter portion 62 with a fluid inlet opening 63, and a portion 64 of large diameter with a fluid outlet opening 65 and a screw plug 66 closing the bore 64. A movable valve member 67 disposed within the bore 64 is provided with a screw abutment 68, an annular recess 69, an annular sealing element 71 slidably received on its outer diameter in the recess 69, but having clearance on its inner diameter, and an O-ring 72 compressively interposed between the base of the recess 69 and the sealing element 71. The sealing element 71 has a sealing edge 73 which is engageable with a fixed co-operating sealing element having a seating face 74 at the junction of the bores 62 and 64. A counterbalancing piston 75 fixed to the sealing element 67 is slidable in the bore 62. The bore 62 is of smaller diameter than the sealing edge 73 whereby the valve member 67 and piston 75 assembly have a differential area subject to fluid pressure at the inlet opening 63 acting to open the valve. A compression spring 76 interposed between the plug 66 and the valve member 67 maintains the valve closed until the fluid pressure at the inlet opening 63 reaches a pre-determined value. The valve therefore operates as an overpressure valve. The valve is also operable as pressure release valve by means of a rotatable cam 77 which is mounted in the housing 51 for co-operative engagement with the free end of the counterbalancing piston 75.

I claim as my invention:
1. A valve comprising
    (a) an outer valve member
        having an internal bore,
        fluid outlet and inlet passages opening into the bore at longitudinally spaced positions,
    (b) an inner valve member
        mounted in said bore for longitudinal movement in a valve-closing direction towards and a valve-opening direction away from said inlet passage,
    (c) a recess disposed in one of said valve members and
        having a base surface,
    (d) an abutment on said one valve member
        having a face spaced longitudinally from the base of the recess,
    (e) resilient means disposed against said base surface,
    (f) a first sealing element
        mounted in said recess between the resilient means and the abutment face,
        this first sealing element having a rear surface within the recess which with the recess defines a fluid-receiving space,
    (g) passage means establishing fluid communication between said fluid-receiving space and that part of the valve bore which is open to fluid inlet pressure
        whereby the rear surface of the first sealing element is exposed to fluid inlet pressure which thereby urges the first sealing element towards the abutment face,
    (h) a second sealing element
        provided on the other of said valve members for cooperative sealing engagement with the first sealing element
            on the same side thereof as the abutment face and at a position in said internal bore lying between the fluid inlet and outlet passages,
    (i) said sealing elements having on one an annular sealing edge and on the other a seating surface
        arranged to provide a substantially linear sealing contact which sustains the entire valve-closing load between the outer and inner valve members,
    (j) said linear sealing contact defining the effective area against which fluid pressure acts to urge said element towards the abutment face,
    (k) and loading means
        including spring means
        and means responsive to fluid inlet pressure
            operative upon the inner valve member, in the valve-closing direction, said loading means being operable at a given inlet pressure to close the valve, with a steady force which is less than that due to said inlet pressure and said resilient means together, urging the first sealing element towards the abutment face, whereby under a closing shock in the valve the first sealing element is initially moved away from the abutment face against the restoring force due to the resilient means and fluid pressure, after which the first sealing element is returned towards the abutment by such restoring force.

2. A fluid valve according to claim 1, wherein the resilient means comprises a compressible ring of resilient material operative between the base surface of the annular recess and the first sealing element mounted therein to establish a fluid seal between that part of the recess that is open by way of the passage means to fluid inlet pressure and that part of the valve bore that is open to fluid outlet pressure.

3. A fluid valve according to claim 1, wherein the annular seating edge is formed upon the first sealing element, and the first sealing element and the loading means acting upon the same are arranged to move with and also with respect to said inner valve member, and wherein the second sealing element is formed upon the outer valve member as a plane surface against which said annular seating edge abuts to seat and close the valve.

4. A valve comprising an outer member formed with an internal bore having three longitudinally spaced portions, a fluid inlet passage opening into the central portion of the bore, and one end portion of the bore being of larger diameter than the opposite end portion thereof, a fluid outlet passage opening into the larger end portion of the bore, an inner valve member mounted in the larger end portion of the bore for longitudinal movement in a valve-closing direction towards the central portion of the bore, and in the opposite direction, said outer valve member being formed with a shoulder facing the larger portion of the bore, constituting a first sealing element at the junction of such larger portion and the central portion, a recess formed in said inner valve member, opening towards said shoulder, and having a base surface, an abutment fixed on said inner valve member having a face spaced longitudinally from and facing the base surface of the recess, resilient means disposed against said base surface, a second sealing element cooperating with said first sealing element, and mounted in said recess between the resilient means and the shoulder, said recess-mounted sealing element having a rear surface within the recess which with the recess defines a fluid-receiving space, passage means establishing fluid communication between said fluid-receiving space and the central portion of the bore, whereby the inlet fluid pressure urges the recess-mounted sealing element towards the abutment face, said cooperating sealing elements having on one an annular seating edge and on the other a seating surface arranged to provide a substantially linear sealing contact which sustains the entire valve-closing load between the outer and inner valve members, which linear contact defines the effective area against which inlet fluid pressure within the recess acts to urge the recess-mounted sealing element against the abutment, plunger means in the smaller end portion of the bore, subject to inlet fluid pressure, and operatively connected to said inner valve member to urge the latter towards the shoulder, and spring means also arranged to supplement said plunger means, together constituting loading means opposing the fluid pressure over the effective area within the recess, said plunger means being of such effective area that the loading means is somewhat inferior to the pressure-induced force urging the recess-mounted sealing element against the abutment.

5. A valve comprising an outer member formed with an internal bore having three longitudinally spaced portions, of which one end portion is of larger diameter than the other end portion, a fluid inlet passage opening from a higher pressure zone into the central portion of the bore, a fluid outlet pasasge venting the larger end portion of the bore to a lower pressure zone, an inner valve member mounted in the larger end portion for longitudinal movement in a valve-closing direction towards the central portion of the bore, and oppositely for valve-opening movement, said outer valve member being formed with a shoulder facing the larger portion of the bore at the junction between said larger portion and the central portion of the bore, and constituting a first sealing element, a recess formed in said inner valve member, opening towards said shoulder, and of an effective outer diameter larger than the shoulder but of an effective inner diameter smaller than the shoulder, said recess having a base surface facing said shoulder, an abutment fixed on said inner valve member, having a face spaced longitudinally from and facing the base surface of the recess, a second sealing element mounted in said recess, to define a space between its rear surface and the base surface of the recess, passage means establishing fluid pressure communication between such space and the central, higher pressure portion of the bore, resilient sealing means interposed between the recess and the second sealing element, about a circle of a diameter exceeding that of the smaller end portion of the bore, said cooperating sealing elements having on one an annular seating edge and on the other a seating surface meeting to provide a substantially circular sealing contact of less diameter than the diameter of the smaller end portion of the bore, plunger means fitting the smaller end portion of the bore and subject to the higher inlet pressure in the central portion of the bore, whereby the inner valve member as a whole is urged to its seat upon the shoulder by the inlet pressure acting upon an annular area of the plunger means that is in excess of like pressure acting upon the area of the second sealing element that lies within the annular seating edge, and the second sealing element is urged against the first sealing element by the inlet pressure acting against the annulus at the rear surface of the second sealing element that is in excess of the diameter of the same sealing element lying within the annular seating edge.

6. A valve as in claim 5, wherein the annular seating edge is formed on the second sealing element, the shoulder cooperating therewith, on the outer valve member, being generally planar, and wherein the resilient sealing means is located adjacent the outer periphery of the second sealing element, and reacts between the rear surface thereof and the base surface of the recess, further to urge the second sealing element against the shoulder.

References Cited in the file of this patent

UNITED STATES PATENTS

| | | |
|---|---|---|
| 122,494 | Russell | Jan. 2, 1872 |
| 763,208 | Robinson | June 21, 1904 |
| 2,129,986 | Berghoeffer | Sept. 13, 1938 |
| 2,311,110 | Johnson | Feb. 16, 1943 |
| 2,713,773 | Sutton | July 26, 1955 |
| 2,713,986 | Suthann | July 26, 1955 |
| 2,984,450 | Doe | May 16, 1961 |
| 3,037,738 | Jackson | June 5, 1962 |
| 3,040,772 | Todd | June 26, 1962 |